(12) United States Patent
Halm

(10) Patent No.: US 11,773,892 B2
(45) Date of Patent: Oct. 3, 2023

(54) THREADED FASTENER WITH IMPROVED RESISTANCE TO BACKING OUT OF A BLIND HOLE

(71) Applicant: Robert Alexander Halm, Bloomington, IN (US)

(72) Inventor: Robert Alexander Halm, Bloomington, IN (US)

( * ) Notice: Subject to any disclaimer, the term of this patent is extended or adjusted under 35 U.S.C. 154(b) by 539 days.

(21) Appl. No.: 16/889,625

(22) Filed: Jun. 1, 2020

(65) Prior Publication Data

US 2021/0372456 A1 Dec. 2, 2021

(51) Int. Cl.
*F16B 3/04* (2006.01)

(52) U.S. Cl.
CPC ...................... *F16B 3/04* (2013.01)

(58) Field of Classification Search
CPC ........ F16B 31/04; F16B 5/02; F16B 19/1063; F16B 39/02; F16B 39/028; F16B 5/0275; F16B 35/00
USPC ...................... 411/383, 412, 286, 385, 263, 6
See application file for complete search history.

(56) References Cited

U.S. PATENT DOCUMENTS

| | | | | |
|---|---|---|---|---|
| 4,022,099 | A * | 5/1977 | Ballantyne | F16B 25/0021 411/383 |
| 4,784,554 | A * | 11/1988 | Break | F16B 37/145 411/401 |
| 5,961,266 | A * | 10/1999 | Tseng | F16B 37/12 411/289 |
| 6,669,422 | B1 * | 12/2003 | Sterle | F16B 5/0233 411/546 |
| 7,985,040 | B2 * | 7/2011 | Cao | F16B 35/041 411/397 |
| 8,506,226 | B2 * | 8/2013 | Martinez | F16B 35/02 411/383 |
| 2008/0310933 | A1 * | 12/2008 | Ricciardo | F16B 39/10 411/389 |
| 2013/0117985 | A1 * | 5/2013 | Siraky | B25B 13/485 81/53.2 |
| 2014/0305266 | A1 * | 10/2014 | Wernersson | B25G 1/10 81/436 |
| 2022/0049738 | A1 * | 2/2022 | Tokumoto | F16B 39/02 |

FOREIGN PATENT DOCUMENTS

| | | | | |
|---|---|---|---|---|
| CN | 111720410 | A * | 9/2020 | ............ F16B 39/02 |
| CN | 112392835 | A * | 2/2021 | ............ F16B 39/02 |
| GB | 2257220 | A * | 1/1993 | ............ F16B 21/10 |

* cited by examiner

*Primary Examiner* — Victor D Batson
*Assistant Examiner* — Dil K. Magar

(57) ABSTRACT

A threaded fastener composed of separate upper and lower portions with a small axial freedom of movement relative to one another. After being threaded into a blind hole together, the portions are moved relative to one another and locked in place, creating a distribution of stresses which resists backing-out of the fastener without the various drawbacks which limit prior art solutions to this and similar threaded fastener applications.

3 Claims, 8 Drawing Sheets

THREADED FASTENER WITH IMPROVED RESISTANCE TO BACKING OUT OF A BLIND HOLE

CROSS-REFERENCE TO RELATED APPLICATIONS

Not Applicable.

BACKGROUND OF THE INVENTION

Threaded fasteners have been used for centuries to secure two or more components of an assembly together by passing through one or more through-holes and then into a concentric threaded hole (whether that be a threaded nut, a threaded blind or through-hole in another component of the clamped assembly, or any other arrangement). Threaded fasteners originally relied on the circumferential friction force created at the interface between the threads of the fastener and the threads of the nut or other threaded hole due to the axial clamping force to resist threading backward out of their engaged, functioning arrangement (i.e., "backing out") due to loads applied to the assembly. It has long been known, however, that cyclic variations in the loading applied to the threaded fastener, whether through cyclic temperature changes, vibration or other cyclic forces applied to the clamped assembly, or other sources, can sometimes overcome this naïve approach to fastener retention, with results that range from inconvenient to costly to tragic.

Prior art contains a wide variety of attempts to solve this problem, however, even those which have been partially successful suffer from significant limitations, and some—even some of those which are widely used—may in fact harm, rather than improve fastener retention (Izumi et al. 2009).

The use of "lock wire" or "safety wire" (e.g., U.S. Pat. No. 2,890,734) is less applicable to the maintenance of clamping force in a threaded fastener than to preventing the fastener from falling out completely: that is, even very small rotations allowed by lock wire can result in a significant loss of clamping force, even though the fastener is retained by the wire after this rotation increases tension on the lock wire, balancing the peak cyclic forces driving the fastener to loosen. Moreover, the application of lock wire requires either that the fasteners thus secured either occur in groups of at least two, or that some other external anchoring point be provided to secure the lock wire, creating a limitation on the design of the assembly to be clamped, and limiting the application of this method as a retrofit to assemblies not originally designed with lock wire in mind.

A wide variety of locking washers has been developed, including simple split-ring lock washers, Belleville spring washers, curved or wave spring washers, toothed washers, multi-turn helical spring washers, and others, as well as various elaborations of these basic designs. These too suffer from disadvantages. Firstly, being a separate element from the threaded fastener itself, all lock washers necessarily increase the number of parts in an assembly, and hence the complexity, cost (both due to their own cost and by virtue of increased logistical burden), and assembly time of the assembly. Additionally, they suffer from functional deficiencies: the split-ring washer (as exemplified, e.g., in NASM35338), for instance, though commonly used, has been shown in both research (Izumi et al. 2009) and practice (Barret 1990) to often create retention characteristics which are actually worse than the same threaded fastener with no lock washer or other special retention device at all. Other washer designs which rely on the same basic principle may suffer from similar poor or negative performance, and doubt and debate exist within the professional community as to their performance, applicability, and safety. Lock washers which are intended to function by indenting or interference into the fastener or the clamped assembly (such as toothed washers) are limited in their application due to the damage which they do to the surface of the fastener or assembly (including the important consequence that whatever mechanism of corrosion protection has been applied to those surfaces can be compromised), and because they must have a greater hardness than the surface which they are intended to indent, which limits and complicates design of the assembly and selection of appropriate fasteners and washers, since high hardness is often a requirement for the performance of threaded fasteners.

Thread-locking compounds or adhesives, like lock washers, increase the complexity of the threaded fastener assembly, undesirably increasing cost and assembly time. Additionally, they tend to make disassembly more difficult, undermining one of the key advantages of threaded fasteners, namely their ease of reversibility and replacement (as compared to rivets, welds, etc.). Further, such compounds or adhesives may be significantly more susceptible to extreme high or low temperatures, extreme chemical environments, or other extremes of the potential use environment than the clamped assembly or the threaded fastener themselves are, thus limiting their potential applications.

Finally, there are a wide variety of mechanisms to improve threaded fastener retention which rely on the fastener being installed in a through-hole (such as various designs of locking nuts or the use of either identical or dissimilar paired nuts in a "jam nut" arrangement). Regardless of their other advantages or disadvantages, needless to say that these methods are limited in their application, in that they cannot be applied to threaded fasteners which are threaded into a blind hole.

BRIEF SUMMARY OF THE INVENTION

One or more embodiments feature a threaded fastener the threaded body of which is divided into two segments with some mobility relative to one another, and a means to increase tension between these two segments after the fastener is threaded into a blind hole, whereby a distribution of mechanical stresses is created in the threaded body which improves fastener retention.

DETAILED DESCRIPTION OF THE INVENTION

First Embodiment

Advantages of one or more embodiments include applicability to uses in which the threaded fastener is threaded into a blind hole; an absence of particular vulnerabilities to environmental factors such as high temperature or hostile chemical environment; simplicity and the reduction of costs and assembly time due to a retention mechanism which is integral to the threaded fastener rather than a separate component or device; and others, as will be made apparent below.

Figure 1:
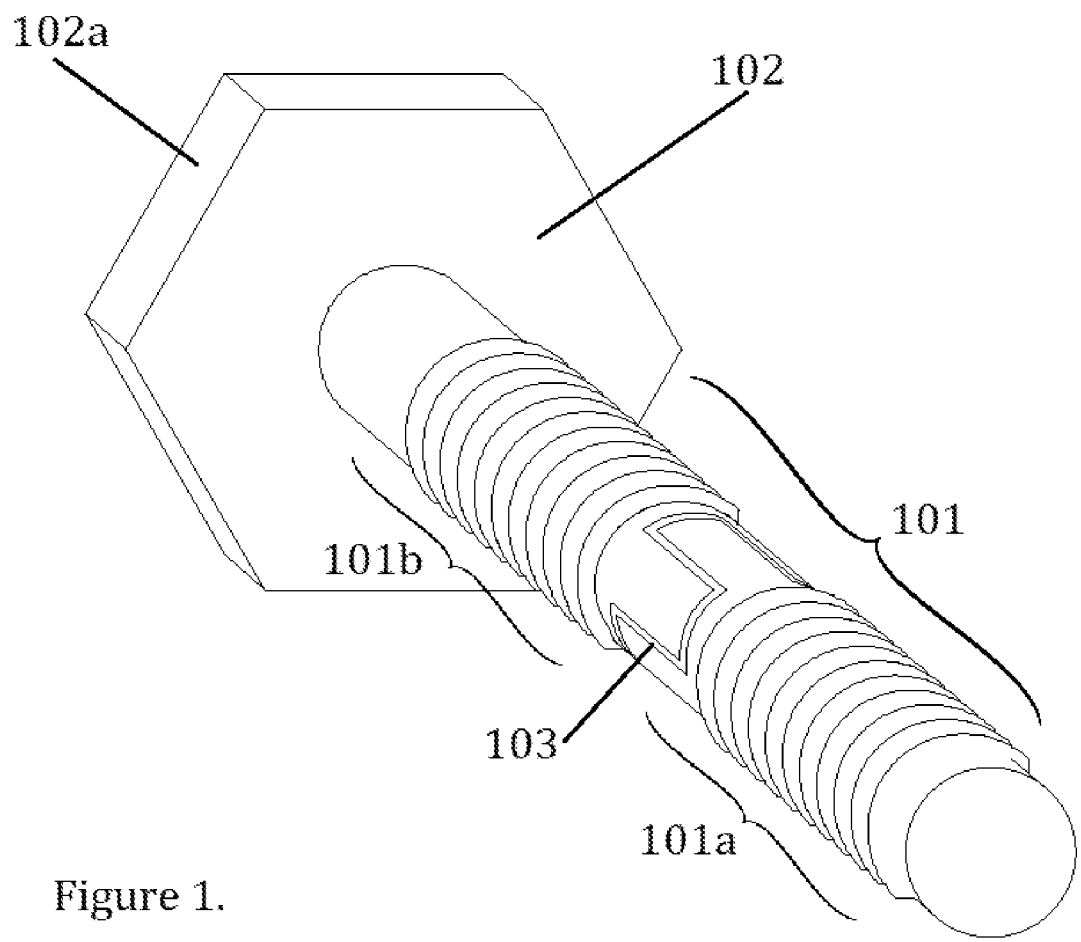
FIG. 1 depicts the first embodiment in isometric view, in a ready-to-use state.

The first embodiment is shown in isometric view in FIG. 1. This figure illustrates a threaded body, 101, composed of two separate segments: a lower threaded body 101a, and an upper threaded body 101b, which are separated from one another by a gap 103. Attached to and contiguous with the upper threaded body 101b is a head 102, with an external profile or surface 102a adapted for hexagonal drive. Note that the threads of the threaded body 101 are cut such that they align helically when there is a non-zero opening of designed dimension of the gap 103.

Figure 2:
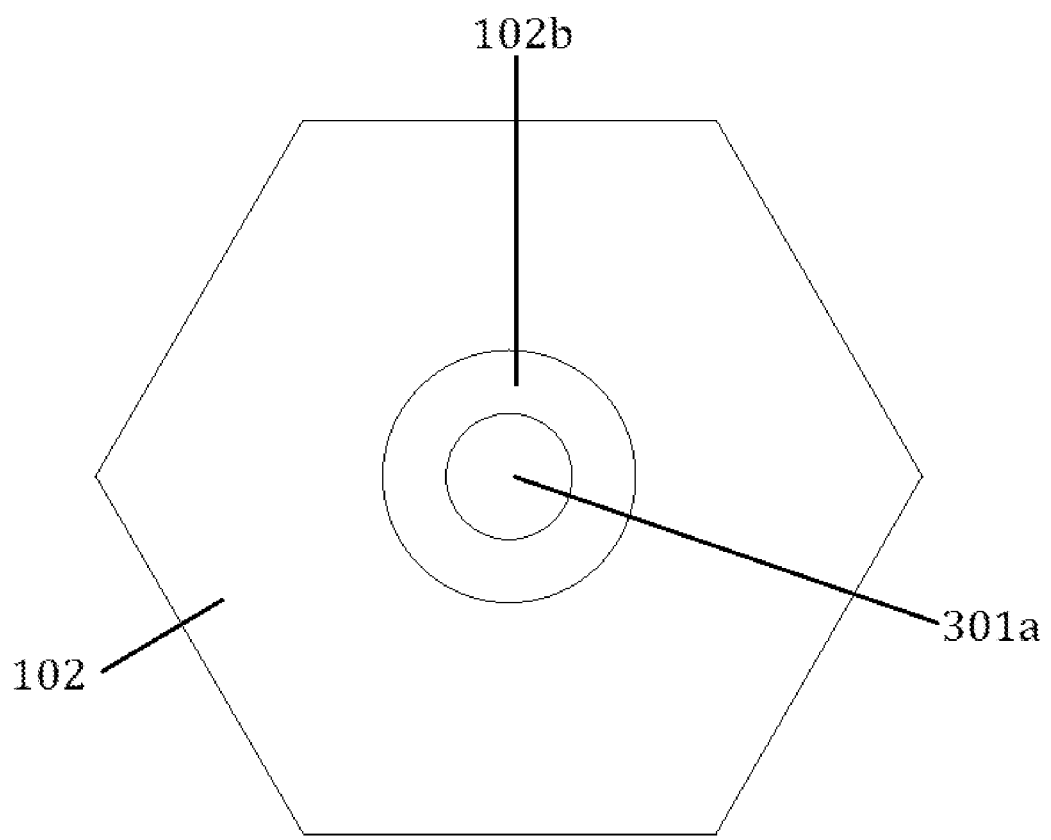
FIG. 2 depicts the head of the first embodiment.

FIG. 2 shows the top view of the head 102 of the first embodiment. In the upper surface of the head 102 is a through-hole 102b. Within this through-hole, an exposed toe 301a of a mandrel of a blind rivet is visible.

Figure 3:
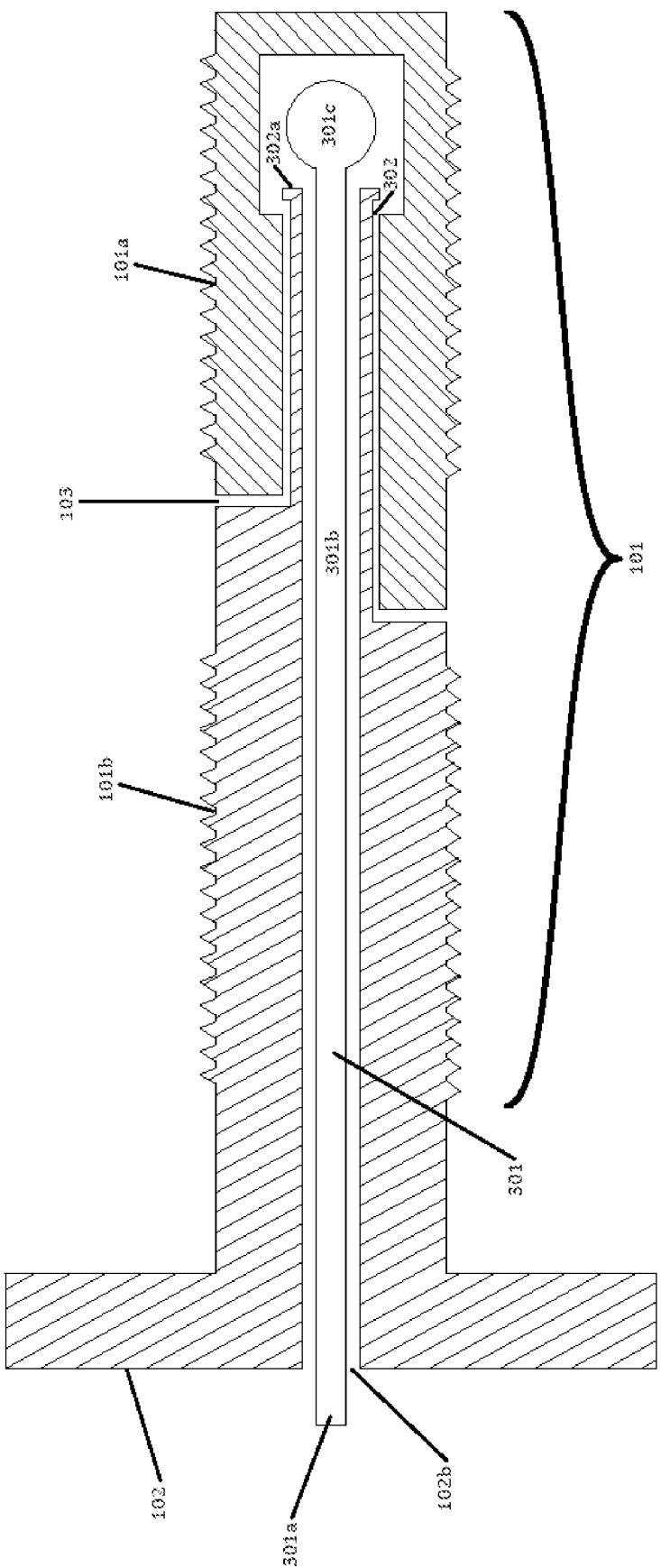
FIG. 3 depicts a section view of the first embodiment in a ready-to-use state.

FIG. 3 provides a section view of the first embodiment in a ready-to-use state, in which the threaded body 101, its component sections the lower threaded body 101a and upper threaded body 101b, and the head 102 with its through-hole 102b are again visible. FIG. 3 also makes visible the entirety of the blind rivet 301, including its exposed mandrel toe 301a, its mandrel shaft 301b, and its mandrel head 301c, as well as a deformable or malleable rivet shaft 302, and a rivet head 302a. The rivet shaft 302, including the rivet head 302a, is integral to and contiguous with the upper threaded body 101b. The gap 103 is again visible between the upper surface of the lower thread body 101a and the lower surface of the upper threaded body 101b.

Figure 4:
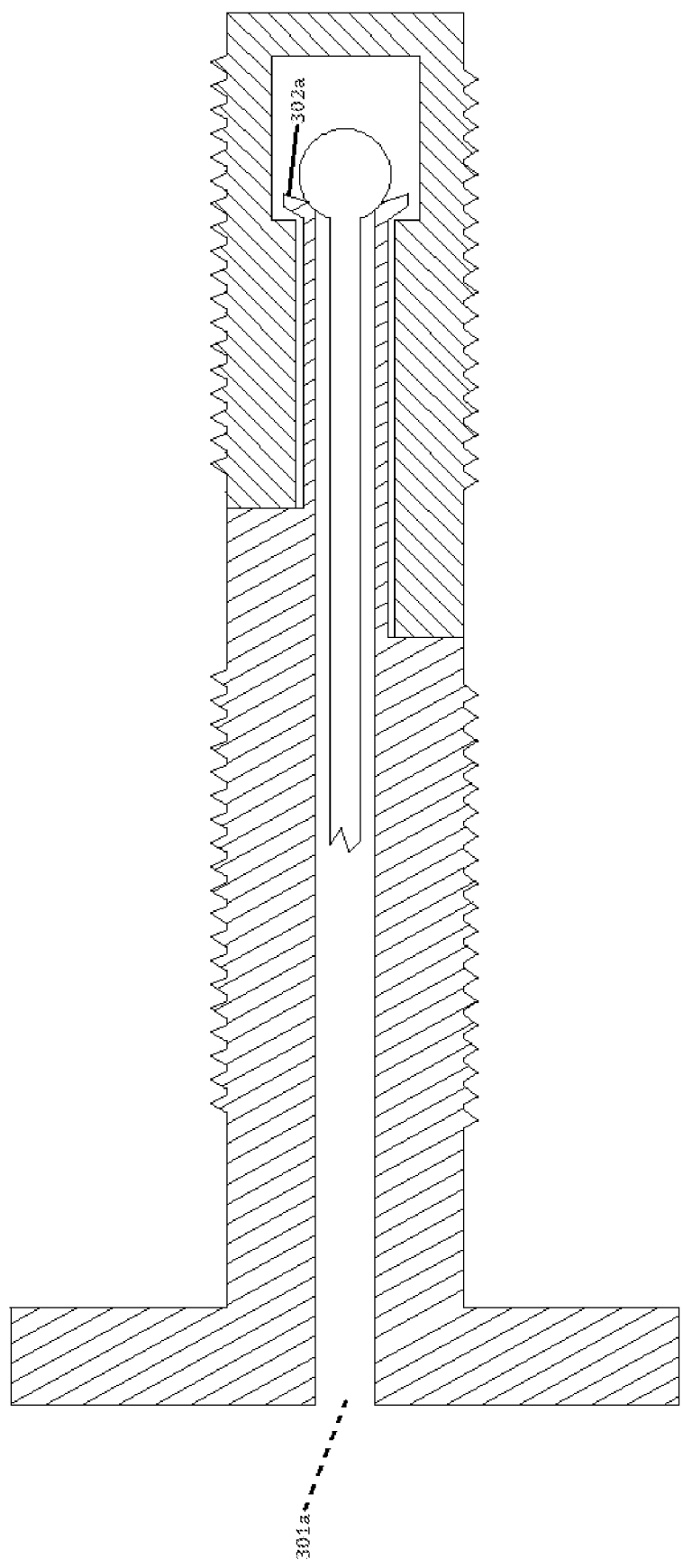
FIG. 4 depicts a similar section view of the first embodiment to FIG. 3, except that FIG. 4 depicts the installed state.

FIG. 4 provides the same section view as FIG. 3, except that FIG. 4 shows the first embodiment in the installed state, and thus shows the rivet head 302a in a fully expanded state, and the exposed mandrel toe 301a, having been snapped off, as absent.

Figure 5:
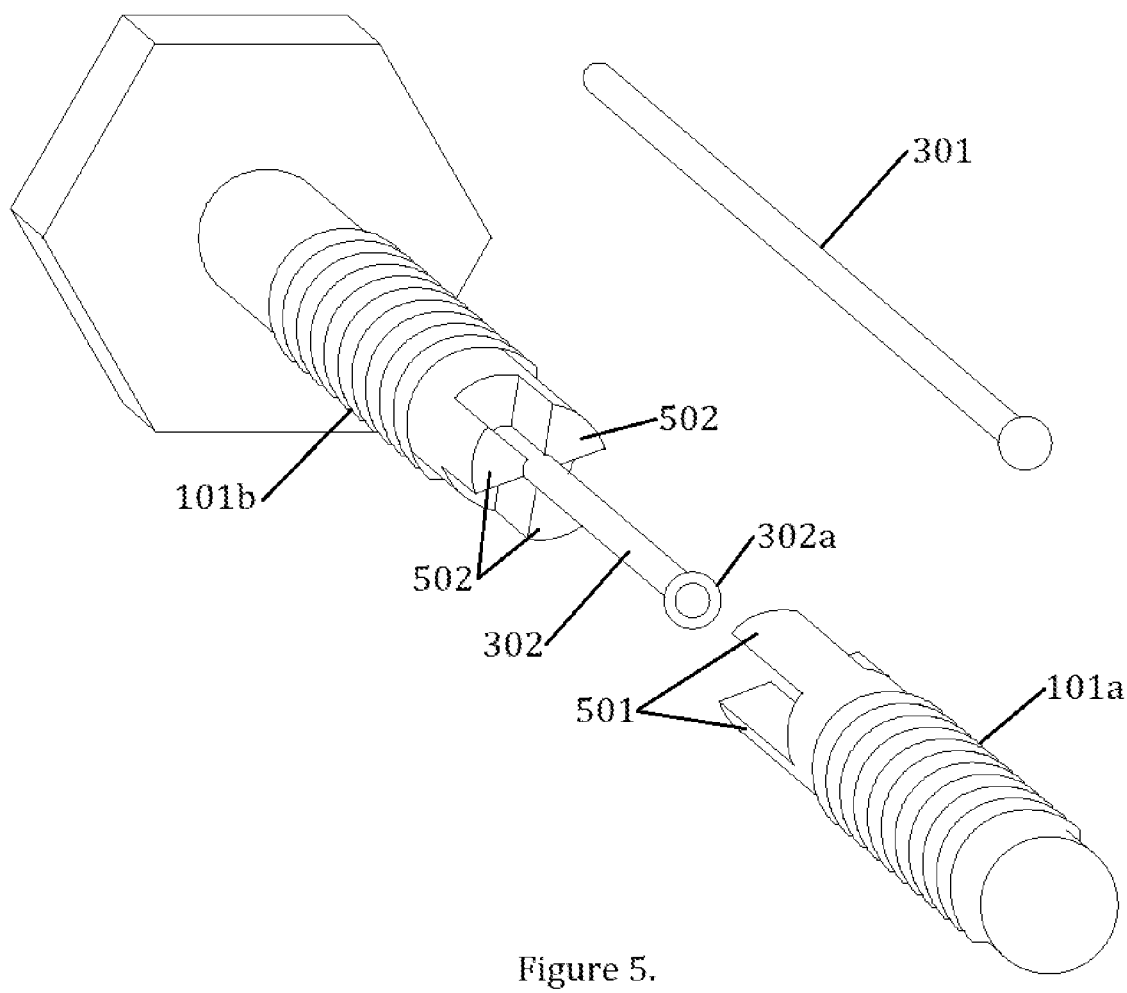
FIG. 5 depicts an exploded view of the first embodiment.

FIG. 5 is an isometric exploded view, which shows how the upper surface of the lower threaded body 101a bears a number of teeth 501 which are rectangular in their circumferential cross-section and wedge-shaped in their axial cross-section. Similarly, the lower surface of the upper threaded body 101b bears a corresponding set of similar teeth 502 which interlock with the teeth 501, forming a dog clutch. Also shown once again is the deformable or malleable rivet shaft 302, and its rivet head 302a.

Operation—First Embodiment

This first embodiment is used in the following manner: The fastener is passed through one or more workpieces which are to be clamped, and threaded into a threaded blind hole, such that the threads of the threaded body 101 engage with the threads of the threaded hole, with the entire fastener turned by application of torque to the outer surface of the head 102a, as with a wrench or equivalent tool. Once the fastener has been seated into the hole with a predetermined torque, the exposed toe 301a of the blind rivet 301 is grasped with a tool and tension is applied, drawing the rivet 301 (which results in the expansion of the rivet head 302a and the snapping off of the exposed mandrel toe 301a. This creates a tension force between the lower threaded body 101a and the upper threaded body 101b of a predetermined magnitude, greater than the axial tension created in the threaded body by the initial predetermined torque; thus the loading on the threads of the upper threaded body 101b is reversed: it is now the lower faces of the threads of the upper threaded body 101b which are in contact with the upper faces of the threads of the threaded hole, rather than vice-versa. After this step, the fastener is fully installed.

Second Embodiment

Figure 6:
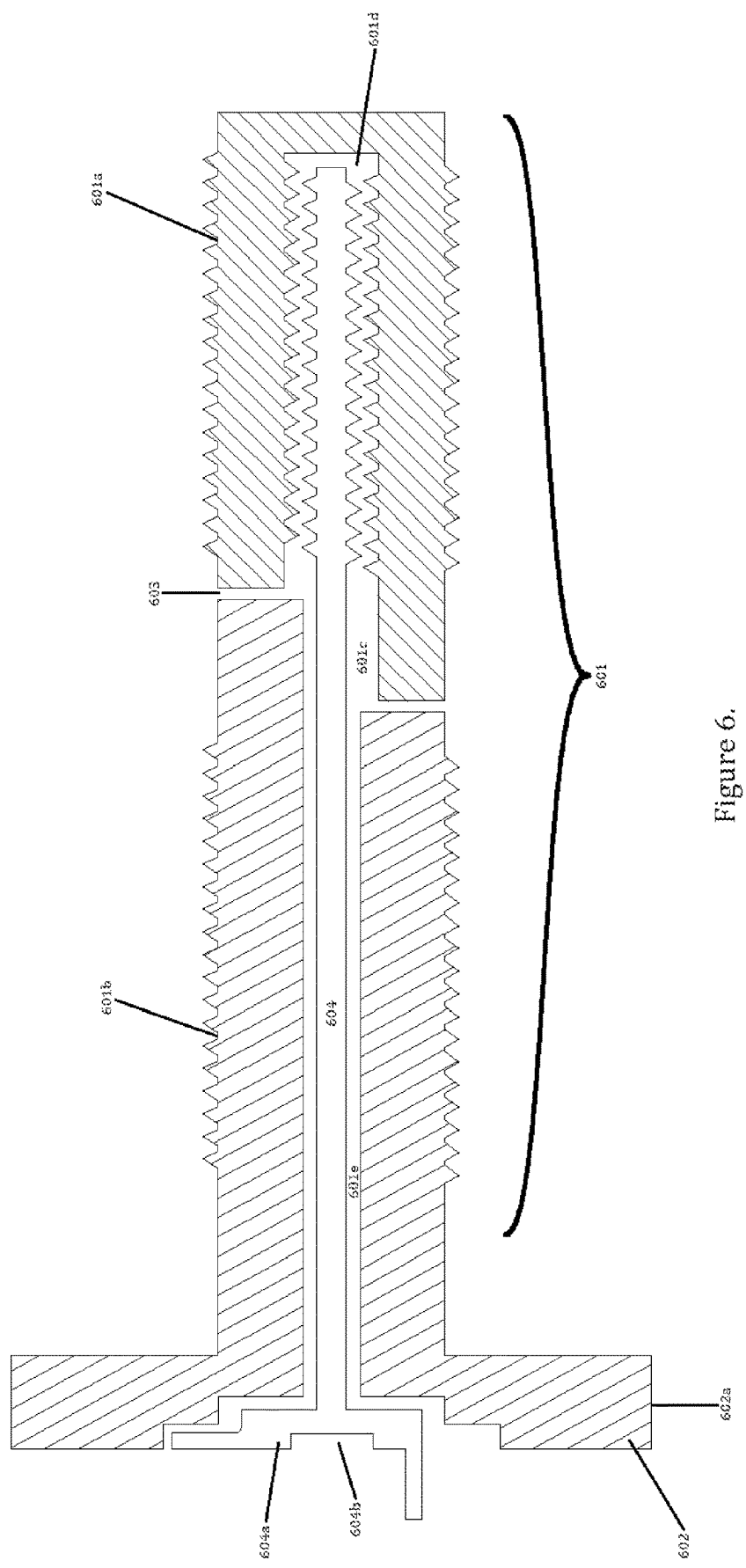
FIG. 6 depicts a section view of the second embodiment.

The second embodiment is shown in section view in FIG. 6. As with the first embodiment in FIG. 3, there is a threaded body, 601, composed of two separate segments: a lower threaded body 601a, and an upper threaded body 601b, which are separated from one another by a gap 603. Attached to and contiguous with the upper threaded body 601b is a head 602, with an external profile or surface 602a adapted for square drive. In the upper surface of the head 602 is visible the upper end of a coaxial inner hole or through-hole 601c. Within this through-hole, there is visible an inner head 604a of an inner threaded rod 604. This inner threaded rod 604 runs the length of the threaded body 601, which bears the coaxial inner hole 601c; the coaxial inner hole 601c is comprised of a threaded coaxial inner hole 601d in the lower threaded body 601a, and an unthreaded coaxial inner hole 601e in the upper threaded body. The inner head 604a itself bears a recess 604b which is adapted to internal hexagonal drive (commonly known as an "Allen head"-type drive).

Figure 7:
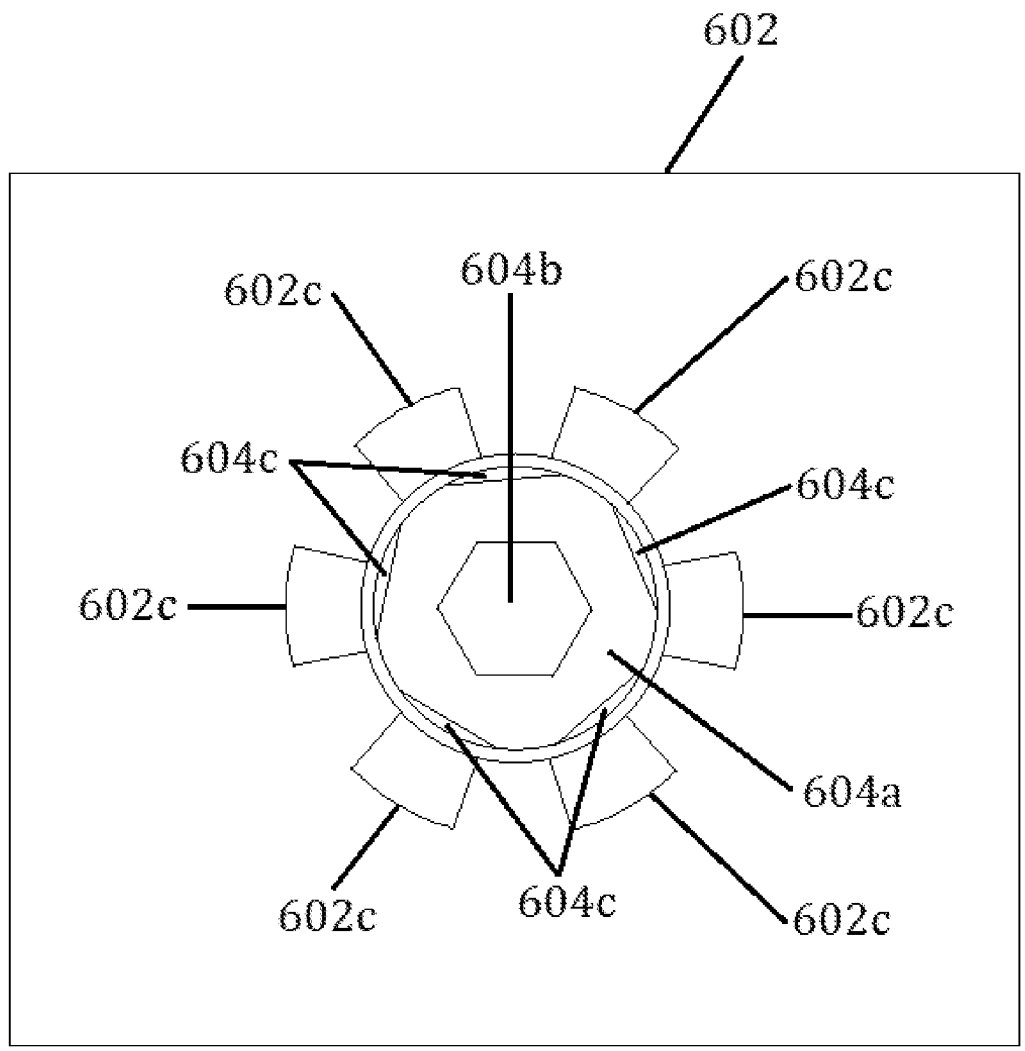
FIG. 7 depicts the head of the second embodiment in a ready-to-use state.
Figure 8:
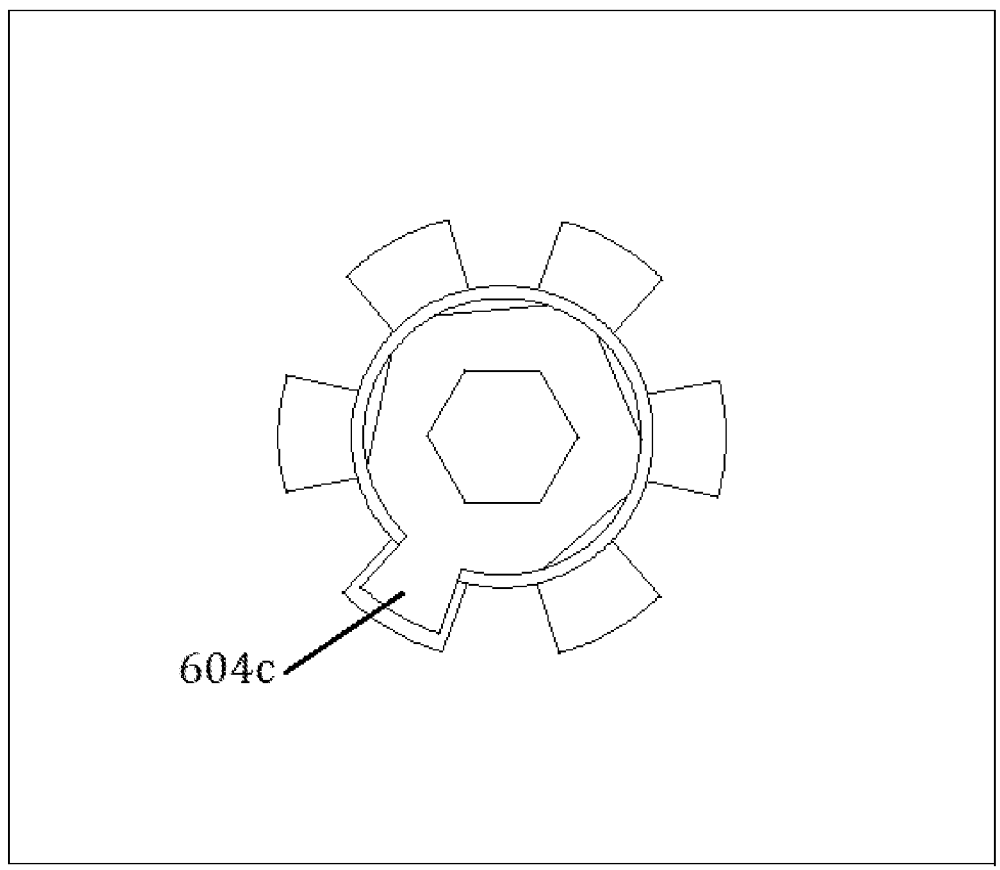
FIG. 8 depicts the head of the second embodiment in the installed state.

FIG. 7 shows a top view of the head 602 of the fastener and the inner head 604a of the inner rod 604, with its recess 604b. Also visible in FIG. 7 are keys 604c of a predetermined number n (illustrated as n=5) projecting radially up from the perimeter of the inner head 604a, and corresponding radial slots 602c in the head 602 of the fastener, of a predetermined number n+1 which is one greater than the predetermined number of the keys 604c (illustrated as n+1=6). FIG. 8 shows one of the keys 604c bent down into one of the radial slots 602c.

Operation—Second Embodiment

This second embodiment is used in the following manner: The fastener is passed through one or more workpieces which are to be clamped, and threaded into a threaded blind hole, such that the threads of the threaded body 601 engage with the threads of the threaded hole, with the entire fastener turned by application of torque to the outer surface of the head 602a, as with a wrench or equivalent tool. Once the fastener has been seated into the hole with a predetermined torque, the inner rod 604 is rotated by the application of torque to the recess 604b of the inner head 604a using a corresponding key wrench, or other tool, while the threaded body 601 is prevented from rotating by being held by another wrench or other tool on the outer surface 602a of its head 602. This creates a tension force between the lower threaded body 601a and the upper threaded body 601b of a predetermined magnitude, greater than the axial tension created in the threaded body by the initial predetermined torque; thus the loading on the threads of the upper threaded body 601b is reversed: it is now the lower faces of the threads of the upper threaded body 601b which are in contact with the upper faces of the threads of the threaded hole, rather than vice-versa. Thereafter, one of the keys 604c is bent down into one of the corresponding slots 602c, preventing the inner rod 604 from loosening. After this step, the fastener is fully installed.

CONCLUSION, RAMIFICATIONS, AND SCOPE

Thus at least one embodiment of the fastener described in this application answers a need left insufficiently addressed by prior art. While the descriptions of the two embodiments above are necessarily specific in many details, these should of course not be construed as limitations of scope, since many other embodiments—for example and without limitation, those which effect the relative movement between two portions through other methods, such as ratcheting mechanisms, thermal expansion or contraction, piezoelectric effect, hydraulic or pneumatic actuation, electromechanical actuation, or any other method—are possible within the scope of the claims contained in the "Claims" section of this application.

REFERENCE NUMBER LIST

First Embodiment

101 Threaded body
101a Lower threaded body
101b Upper threaded body
102 Head
102a External profile of head
102b Through-hole
103 Gap
301 Blind rivet
301a Mandrel toe of blind rivet
301b Mandrel shaft of blind rivet
301c Mandrel head of blind rivet
302 Deformable rivet shaft
302a Rivet head
501 Teeth of lower threaded body
502 Teeth of upper threaded body Second Embodiment 601 Threaded body
601a Lower threaded body
601b Upper threaded body
601c Through-hole
601d Threaded coaxial inner hole in lower threaded body
601e Unthreaded coaxial inner hole in upper threaded body
602 Head
602a External profile of head
602c Radial slots
603 Gap
604 Inner threaded rod
604a Inner head of inner threaded rod
604b Recess
604c Keys

SOURCES CITED

Barret, Richard T. (1990). *NASA Reference Publication 1228: Fastener Design Manual.* Lewis Research Center, Cleveland, Ohio
Izumi, S., Yokoyama, T., Kimura, M., & Sakai, S. (2009). Loosening-resistance evaluation of double-nut tightening method and spring washer by three-dimensional finite element analysis. *Engineering failure analysis,* 16(5), 1510-1519.
Mullin, J. F. (1959). U.S. Pat. No. 2,890,734. Washington, D.C.: U.S. Patent and Trademark Office.
NASM35338 *Washer, Lock-Spring, Helical, Regular (Medium) Series.* Arlington, Va.: National Aerospace Standards Committee & Aerospace Industries Association. 2014.

I claim:
1. A machine, being a threaded fastener with superior resistance to failure of pre-torque in blind holes, comprising:
  a) a threaded body, having a main axis, and consisting of two portions, namely a lower threaded body and an upper threaded body;
  b) said lower threaded body, having an outer threaded surface, and having a lower interfacing surface in loose contact with a corresponding upper interfacing surface of said upper threaded body, featuring one or more mechanisms selected from the group consisting of dog clutches, toothed clutches, loose dowel joints, or other equivalent mechanisms, whereby torque about said main axis of said threaded body may be transmitted between said lower threaded body and said upper threaded body, while simultaneously allowing substantial freedom of axial movement between said lower threaded body and said upper threaded body;
  c) said upper threaded body, having said upper interfacing surface;
  d) a head, connected rigidly to the upper threaded body, and provided with means to be forcibly rotated by hand-held or non-hand-held tools, selected from the group consisting of hexagonal-head drive surfaces about the perimeter, square-head drive surfaces about the perimeter, hexagonal recesses known commonly as Allen head recesses, slots, cruciform slots or recesses, or other common means for driving threaded fasteners; and
  e) a means for transmitting tensional forces between said lower threaded body and said upper threaded body, which can be activated or allow for the varying of said tensional forces at least one time after said machine is threaded into an internally threaded hole.

2. The machine of claim 1), wherein said means for transmitting tensional forces between said lower threaded body and said upper threaded body is composed of a mandrel with a mandrel toe, A mandrel shaft, and A mandrel head, and also a deformable rivet shaft with a rivet head, the mandrel being accessible in a socket or cavity of said head, whereby the drawing of said mandrel, causing deformation of said deformable rivet shaft, pulls said lower threaded body and said upper threaded body toward one another.

3. The machine of claim 1), wherein said means for transmitting tensional forces between said lower threaded body and said upper threaded body is a threaded rod, having a smaller diameter than said threaded body, and having a thread pitch finer than the thread pitch of said threaded body, inserted into a smooth-sided hole running through said upper threaded body and coaxial therewith, and an internally threaded hole running through said lower threaded body and coaxial therewith, and having a means at an accessible upper end of said threaded rod whereby said threaded rod can be rotated relative to said lower threaded body and said upper threaded body, through which action said lower threaded body and said upper threaded body are pulled toward one another.

<p style="text-align:center">* * * * *</p>